(12) United States Patent
Todd et al.

(10) Patent No.: US 10,812,326 B1
(45) Date of Patent: Oct. 20, 2020

(54) METHOD AND SYSTEM FOR DATA FABRIC AUTOMATED CONFIGURATION FOR INTERNET OF THINGS DEVICES

(71) Applicant: EMC IP Holding Company LLC, Hopkinton, MA (US)

(72) Inventors: Stephen James Todd, North Conway, NH (US); Trevor Scott Conn, Austin, TX (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/529,743

(22) Filed: Aug. 1, 2019

(51) Int. Cl.
  *H04L 12/24* (2006.01)
  *H04L 29/06* (2006.01)
  *H04L 9/06* (2006.01)
  *H04L 29/08* (2006.01)
  *H04L 9/32* (2006.01)

(52) U.S. Cl.
  CPC ........ *H04L 41/0813* (2013.01); *H04L 9/0643* (2013.01); *H04L 9/3247* (2013.01); *H04L 41/0893* (2013.01); *H04L 67/12* (2013.01); *H04L 67/42* (2013.01); *H04L 2209/38* (2013.01)

(58) Field of Classification Search
  None
  See application file for complete search history.

(56) References Cited

U.S. PATENT DOCUMENTS 8,959,070 B2 * 2/2015 Elbaz .................... G06F 16/345
                                                                  707/705

* cited by examiner

*Primary Examiner* — Brian Whipple
(74) *Attorney, Agent, or Firm* — Chamberlain, Hrdlicka, White, Williams, & Aughtry (57) ABSTRACT

A method for managing data in accordance with one or more embodiments of the invention includes obtaining, by a data management system, a data confidence fabric (DCF) configuration request from a client, and in response to the DCF configuration request: providing a plurality of DCF configuration options to the client, obtaining acceptance of a portion of the plurality of DCF configuration options, generating a DCF configuration file based on the portion of the plurality of DCF configuration options, wherein the configuration file specifies a DCF pipeline, and deploying the DCF configuration file to a local data manager.

20 Claims, 9 Drawing Sheets

METHOD AND SYSTEM FOR DATA FABRIC AUTOMATED CONFIGURATION FOR INTERNET OF THINGS DEVICES

BACKGROUND

Systems may be configured to obtain information from multiple devices. Traditional approaches to configuring such systems require manual configuration and manual updating as devices from which the system is receiving information change.

SUMMARY

In general, in one aspect, the invention relates to a method for managing data. The method includes obtaining, by a data management system, a data confidence fabric (DCF) configuration request from a client, and in response to the DCF configuration request: providing a plurality of DCF configuration options to the client, obtaining acceptance of a portion of the plurality of DCF configuration options, generating a DCF configuration file based on the portion of the plurality of DCF configuration options, wherein the configuration file specifies a DCF pipeline, and deploying the DCF configuration file to a local data manager.

In general, in one aspect, the invention relates to non-transitory computer readable medium which includes computer readable program code, which when executed by a computer processor enables the computer processor to perform a method for managing data. The method includes obtaining, by a data management system, a data confidence fabric (DCF) configuration request from a client, and in response to the DCF configuration request: providing a plurality of DCF configuration options to the client, obtaining acceptance of a portion of the plurality of DCF configuration options, generating a DCF configuration file based on the portion of the plurality of DCF configuration options, wherein the configuration file specifies a DCF pipeline, and deploying the DCF configuration file to a local data manager.

In general, in one aspect, the invention relates to a system that includes a processor and memory that includes instructions, which when executed by the processor perform a method for managing data. The method includes obtaining, by a data management system, a data confidence fabric (DCF) configuration request from a client, and in response to the DCF configuration request: providing a plurality of DCF configuration options to the client, obtaining acceptance of a portion of the plurality of DCF configuration options, generating a DCF configuration file based on the portion of the plurality of DCF configuration options, wherein the configuration file specifies a DCF pipeline, and wherein the DCF pipeline specifies at least one of: a process for augmenting data, a process for modifying data, and a process for storing data, and deploying the DCF configuration file to a local data manager.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to a method and system for managing local data systems. More specifically, embodiments of the invention include using a data management system to obtain configuration requirements from a client to configure the local data system. The data management system may generate a data confidence fabric (DCF) configuration file and deploy the DCF configuration file to one or more corresponding local data systems.

Further, embodiments of the invention include functionality for configuring local data managers of the corresponding local data systems in accordance with the obtained DCF configuration file and to process the subsequently received data in accordance with the DCF configuration file.

Figure 1A:
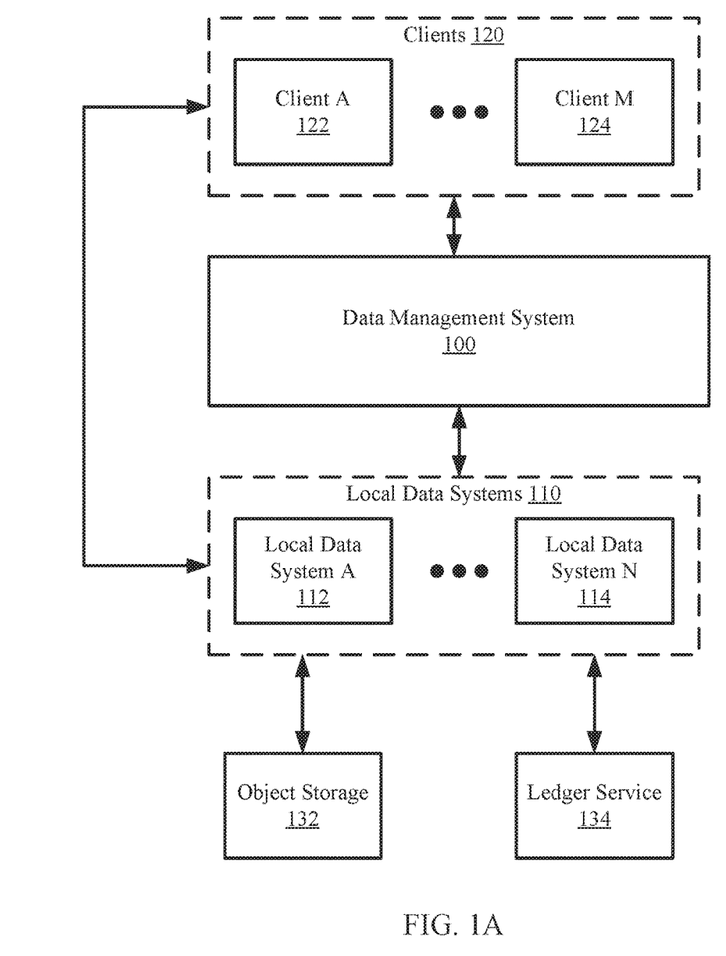
FIG. 1A shows a diagram of a system in accordance with one or more embodiments of the invention.

FIG. 1A shows a diagram of a system in accordance with one or more embodiments of the invention. The system includes a data management system (100), local data systems (110), clients (120), and an object storage (132), and a ledger service (134). Each component of the system may be operably connected via any combination of wired and/or wireless connections. The system may include additional, fewer, and/or different components without departing from the invention. Each component of the system illustrated in FIG. 1A is discussed below.

In one or more embodiments of the invention, the data management system (100) manages a data confidence fabric. In one or more embodiments of the invention, a data confidence fabric (DCF) is a logical grouping of computing devices configured to store data and provide data to clients (120). In one or more embodiments of the invention, the local data systems (110) are part of the DCF.

In one or more embodiments of the invention, the data management system (100) manages the DCF by configuring computing devices associated with the DCF to store data and/or provide data in a way that is requested by the clients (120). The data management system (100) may communicate with the clients (120) by providing the client a set of options for configuring the DCF computing devices (e.g., the local data systems (110)). The data management system may be further equipped to deploy configurations based on a selection of configuration options selected by the clients (120). For additional details regarding the configuration management of the data management system (100), see, e.g., FIG. 2A.

Figure 4:
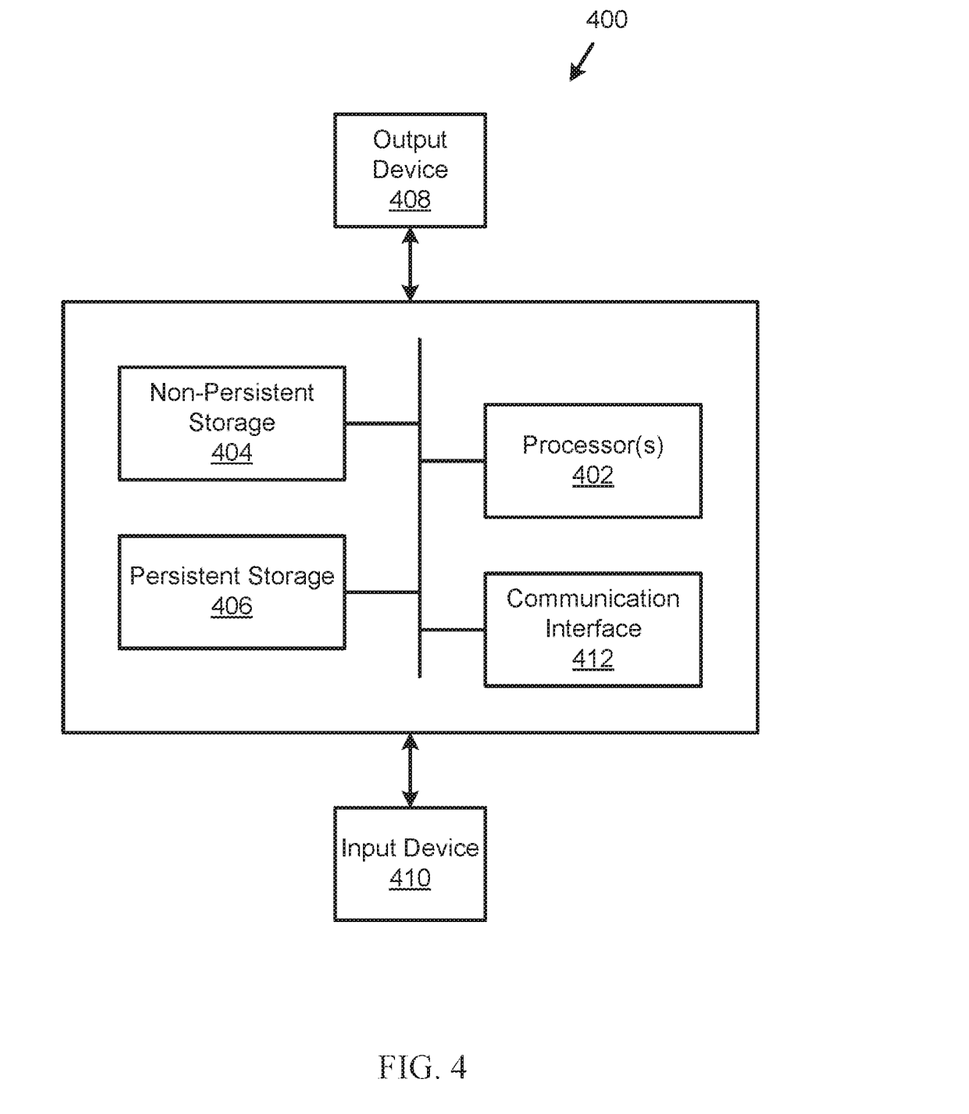
FIG. 4 shows a diagram of a computing device in accordance with one or more embodiments of the invention.

In one or more embodiments of the invention, the data management system (100) is implemented as a computing device (see, e.g., FIG. 4). The computing device may be, for example, a mobile phone, tablet computer, laptop computer, desktop computer, server, or cloud resource. The computing device may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions of the data management system (100) described in this application and/or all, or portion, of the methods illustrated in FIG. 2A.

The data management system (100) may be implemented as a logical device without departing from the invention. The logical device utilizes computing resources of any number of physical computing devices to provide the functionality of the data management system (100) described throughout this application and/or all, or portion, of the methods illustrated in FIG. 2A. For additional details regarding the data management system, see, e.g., FIG. 1B.

In one or more embodiments of the invention, the local data systems (110) are systems associated with a data confidence fabric that obtains data, stores data, provides data, and/or execute applications based on the stored data. The local data systems (110) may provide the stored data and/or applications to the clients (120) as specified by terms agreed to by the clients (120) based on transactions between the clients (120) and the local data systems (110).

In one or more embodiments of the invention, computing devices executing within the local data systems (110) may be associated with the DCF. In this manner, the data management system (100) may include functionality to configure one or more computing devices of the local data systems (110).

In one or more embodiments of the invention, each local data system (110) is implemented as a computing device (see, e.g., FIG. 4). A computing device may be, for example, a mobile phone, tablet computer, laptop computer, desktop computer, server, or cloud resource. The computing device may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions of the local data system (110) described throughout this application and/or all, or portion, of the method illustrated in FIGS. 2B-2C A local data system (112, 114) may be implemented as a logical device without departing from the invention. The logical device utilizes computing resources of any number of physical computing devices to provide the functionality of the local data system (112, 114) described throughout this application and/or all, or portion, of the method illustrated in FIGS. 2B-2C. For additional details regarding a local data system (112, 114), see, e.g., FIG. 1B.

In one or more embodiments of the invention, the clients (120) may utilize computing resources and/or access data of the local data systems (110). The clients (120) may further communicate with the data management system (100) to select configuration options for configuring computing devices of the local data systems (110) and provide the options to the data management system (100).

In one or more embodiments of the invention, each client (122, 124) is implemented as a computing device (see, e.g., FIG. 4). A computing device may be, for example, a mobile phone, tablet computer, laptop computer, desktop computer, server, or cloud resource. The computing device may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions of the client (122, 124) described throughout this application.

A client (122, 124) may be implemented as a logical device without departing from the invention. The logical device utilizes computing resources of any number of physical computing devices to provide the functionality of the client (122, 124) described throughout this application.

In one or more embodiments of the invention, an object storage (132) is a service that stores data and, optionally, metadata obtained from the local data systems (110). The object storage (132) may be equipped to store immutable entries (i.e., entries that cannot be modified or deleted), where each entry includes an object data identifier of the data and/or additional metadata of the data. The object data identifier may be a unique identifier generated by performing a function (e.g., a hash function) on an obtained data set (or a portion thereof) to obtain a unique value (i.e., the object data identifier). The object storage (132) may be internal or external to a local data system (112, 114) without departing from the invention.

In one or more embodiments of the invention, the additional metadata of an entry may specify additional information about a data set such as, for example, an owner of the data set, a geographical location of the data set, and/or other information associated with the data set without departing from the invention.

In one or more embodiments of the invention, the object storage (132) is implemented as a computing device (see, e.g., FIG. 4). The computing device may be, for example, a mobile phone, tablet computer, laptop computer, desktop computer, server, or cloud resource. The computing device may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions of the object storage (132) described throughout this application.

In one or more embodiments of the invention, the object storage (132) is implemented as a logical device. The logical device may utilize computing resources of any number of physical computing devices to provide the functionality of the object storage (132) described throughout this application.

In one or more embodiments of the invention, a ledger service (134) is a service that stores data and/or metadata obtained from the local data systems (110). The ledger service (134) may be equipped to store immutable entries, where each entry includes a data and/or the metadata of the data. The ledger service may be internal or external to a local data system (112, 114) without departing from the invention. In scenarios in which the entries do not include the data (or where the data is otherwise not stored in the ledger service), the entries may include a reference to the data (e.g., a reference to a location in the object storage and/or a reference to a location in the local data manager).

The ledger service may differ from the object storage (132) in that the ledger service (134) is equipped to implement security measures for the immutable entries. The security measures may include, for example, using private key decryption, peer validation (e.g., using third-party computing devices to validate the entries), etc. Other security measures may be implemented on the immutable entries of the ledger service (134) without departing from the invention.

The ledger service (134) may further differ from the object storage (132) by storing a limited amount of data. Said another way, each entry of the ledger service (134) may use less data than the object storage such that the total amount of data stored in the ledger service (134) is less than that of the object storage (132). For example, an entry of the ledger service (134) may store a hash value of the data stored in an entry of the object storage (132).

In one or more embodiments of the invention, the ledger service (134) is implemented as a computing device (see, e.g., FIG. 4). The computing device may be, for example, a mobile phone, tablet computer, laptop computer, desktop computer, server, or cloud resource. The computing device may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions of the ledger service (134) described throughout this application.

In one or more embodiments of the invention, the ledger service (134) is implemented as a logical device. The logical device may utilize computing resources of any number of physical computing devices to provide the functionality of the ledger service (134) described throughout this application.

In one or more embodiments of the invention, the ledger service (134) is implemented as a distributed ledger (e.g., a blockchain). The logical device may utilize computing resources of any number of physical computing devices to provide the functionality of the ledger service (134) described throughout this application.

Figure 1B:
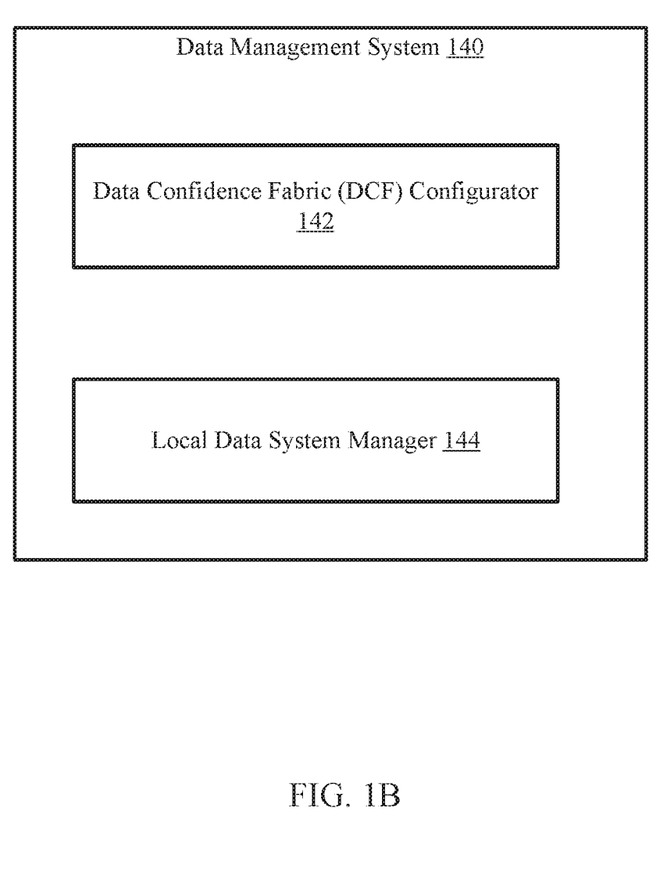
FIG. 1B shows a diagram of a data management system in accordance with one or more embodiments of the invention.

FIG. 1B shows a diagram of a data management system in accordance with one or more embodiments of the invention. The data management system (140) may be an embodiment of the data management system (100, FIG. 1A) discussed above. As discussed above, the data management system (140) communicates with clients to obtain a selection of configuration options and uses the selection to generate DCF configuration files to be deployed to one or more local data systems.

To perform the aforementioned functionality, the data management system (140) includes a data confidence fabric (DCF) configurator (142) and a local data system manager (144). The data confidence fabric (DCF) configurator (142) and a local data system manager (144) may be operably connected via any combination of wired and/or wireless networks without departing from the invention. The data management system (140) may include additional, fewer, and/or different components without departing from the invention. Each of the aforementioned components is discussed below.

In one or more embodiments of the invention, the DCF configurator (142) communicates with the clients to present options for configuring one or more local data systems. The options may be presented via a graphical user interface (GUI). The DCF configurator may send the options to the client to be displayed by the GUI operating in the client.

In one or more embodiments of the invention, the options (also referred to as configuration options) specify configurations to be implemented on local data managers of the local data systems. The configurations may specify options for augmenting unprocessed data and/or modifying the unprocessed data to generate processed data, and/or options for storing the data (either processed data or unprocessed data). The configurations may be associated with a DCF pipeline in which the data is obtained and/or stored. In one or more embodiments of the invention, a DCF pipeline is a process (which may include multiple processing steps) to be performed by a local data manager when obtaining and/or storing unprocessed data.

In one or more embodiments of the invention, the GUI may specify options for augmenting the unprocessed data. In one or more embodiments of the invention, the unprocessed data is augmented by generating additional data to be embedded in the unprocessed data prior to storage. The additional data may be, for example, metadata, digital signatures, identification information, etc.

In one or more embodiments of the invention, the metadata includes characteristics that may be useful to a computing device obtaining the data to determine a reliability of the data. The characteristics may include, for example, a data set identifier (e.g., a combination of letters, characters, and/or numbers that uniquely identify the processed or unprocessed data), a geographical location associated with the data, a type of data (e.g., temperature measurements, recorded video, speedometer data, etc.), a data source identifier (e.g., a combination of letters, characters, and/or numbers that uniquely identify a local data source from which the unprocessed data was obtained), etc. A client may specify, using the GUI, which, if any, of the characteristics should be generated and/or embedded into (or otherwise associated with) the unprocessed data.

In one or more embodiments of the invention, the identification information specifies ownership of the data. The owner of the data may be a legal entity that has the right to store, obtain, use, and/or profit from the data. A legal entity may be a person, a group of people, a partnership, corporation, any other business entity, or any combination thereof. The client may specify, using the GUI, whether the identification information should be generated and/or embedded into (or otherwise associated with) the unprocessed data.

In one or more embodiments of the invention, a digital signature of unprocessed data is data that is generated using a private key and the unprocessed data. The digital signature may be generated, for example, by performing a function (e.g., a hash function) on the unprocessed data to generate a value, and performing a secondary function (e.g., encryption) on the value using the private key. The client may specify, using the GUI, whether a digital signature should be generated and/or embedded into (or otherwise associated with) the unprocessed data.

In one or more embodiments of the invention, the GUI specifies options for modifying the unprocessed data. The data may be modified by, for example, performing an encryption and/or performing compression on the unprocessed or processed data prior to storing the data. In one or more embodiments of the invention, performing compression on unprocessed data includes applying a compression algorithm on the unprocessed data to generate processed data such that the processed data includes less data than the unprocessed data. The client may specify, using the GUI, whether to modify the data prior to storage and/or the type of modification to perform (e.g., encryption, compression, etc.).

In one or more embodiments of the invention, the GUI specifies options for storing the data. The data may be stored internally in the local data system (e.g., in a persistent storage of the local data manager) and/or externally. For example, the data (processed or unprocessed) may be replicated and stored in a ledger service. In such embodiments, the data (processed or unprocessed) may be stored by generating a ledger entry and storing the data and/or any metadata associated with the data in the ledger entry to be stored in the ledger service. The metadata associated with the data (processed or unprocessed) may further be stored in an object storage. The ledger entry may be used by, e.g., clients for auditing purposes.

In one or more embodiments of the invention, the client specifies, using the GUI, options for storing the processed or unprocessed data and/or any metadata associated with the processed or unprocessed data. The options may include storing the data in a ledger service and/or storing the metadata (if any) in an object storage.

The invention is not limited to aforementioned options from which the user may select via a GUI. Moreover, while the options may be selected using a GUI, the options may be selected using any other selection mechanism (now or later discovered) without departing from the invention.

In one or more embodiments of the invention, the DCF configurator (142) generates a DCF configuration file based on the selection of options obtained from the client. For additional details regarding the generation of the DCF configuration file, see, e.g., FIG. 2A.

In one or more embodiments of the invention, DCF configurator (142) is a hardware device including circuitry. The DCF configurator (142) may be, for example, a digital signal processor, a field programmable gate array, or an application specific integrated circuit. The DCF configurator (142) may be other types of hardware devices without departing from the invention.

In one or more embodiments of the invention, the DCF configurator (142) is implemented as computing code stored on a persistent storage that when executed by a processor of the data management system (140) performs the functionality of the DCF configurator (142). The processor may be a hardware processor including circuitry such as, for example, a central processing unit or a microcontroller. The processor may be other types of hardware devices for processing digital information without departing from the invention.

In one or more embodiments of the invention, the local data system manager (144) interfaces with local data systems to configure one or more local data systems. Specifically, the local data system manager (144) deploys DCF configuration files generated by the DCF configurator (142). The local data system manager (152) may identify the local data managers to which to send the DCF configuration files and subsequently send the DCF configuration files to the identified local data managers.

In one or more embodiments of the invention, local data system manager (144) is a hardware device including circuitry. The local data system manager (144) may be, for example, a digital signal processor, a field programmable gate array, or an application specific integrated circuit. The local data system manager (144) may be other types of hardware devices without departing from the invention.

In one or more embodiments of the invention, the local data system manager (144) is implemented as computing code stored on a persistent storage that when executed by a processor of the data management system (140) performs the functionality of the local data system manager (144). The processor may be a hardware processor including circuitry such as, for example, a central processing unit or a microcontroller. The processor may be other types of hardware devices for processing digital information without departing from the invention.

Figure 1C:
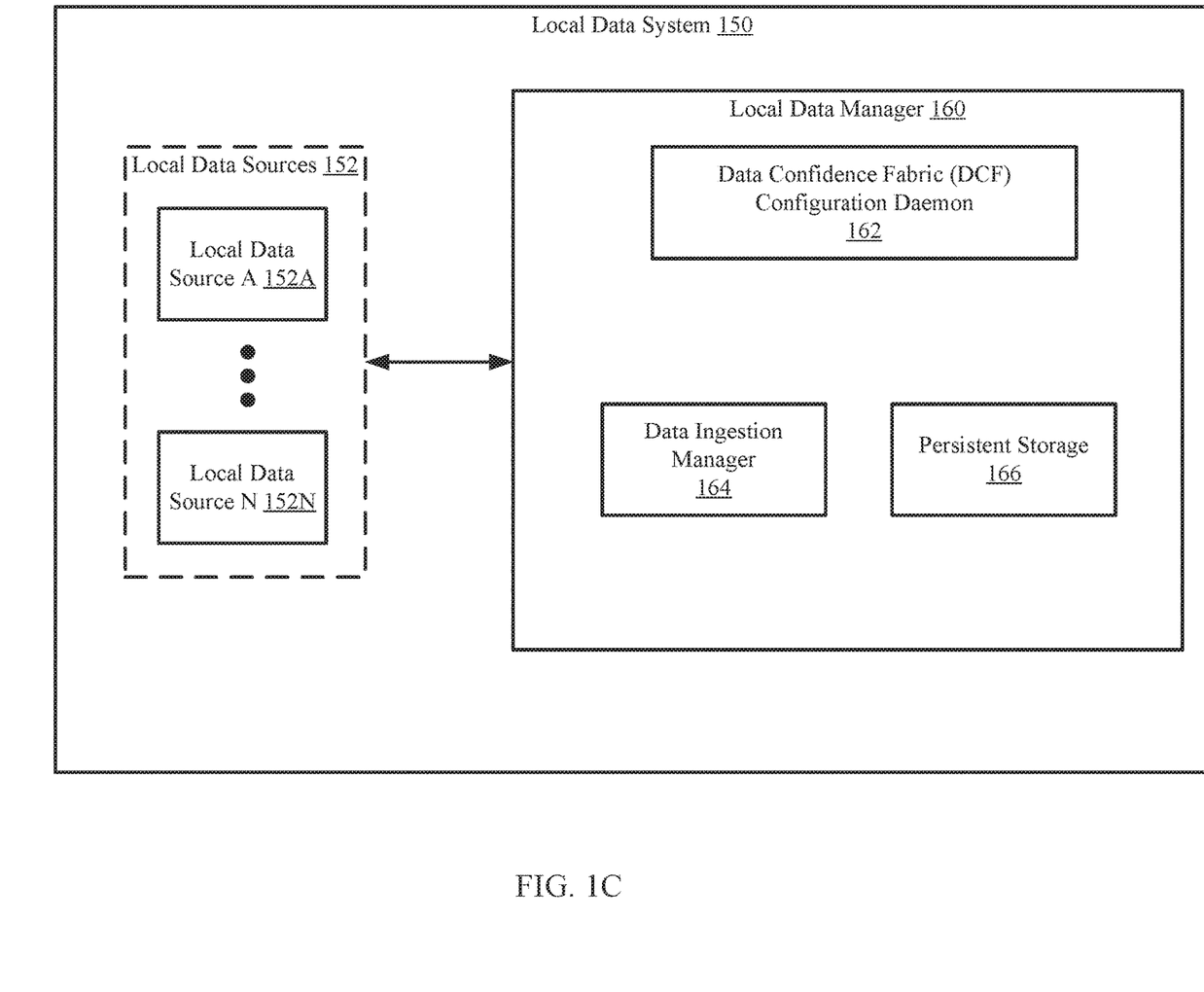
FIG. 1C shows a diagram of a local data system in accordance with one or more embodiments of the invention.

FIG. 1C shows a diagram of a local data system in accordance with one or more embodiments of the invention. The local data system (150) may be similar to a local data system (112, 114, FIG. 1A) discussed above. The local data system (150) may include local data sources (152) and a local data manager (160). The local data system (150) may include additional, fewer, and/or different components without departing from the invention. Each component of the local data system (150) illustrated in FIG. 1C is discussed below.

In one or more embodiments of the invention, the local data sources (152) are sources of data obtained from real-world processes. A data source may be, for example, a sensor. The sensor may be a hardware device for supplying data regarding a real-world process. For example, the sensor may be a count sensor that determines the number of items that are present in a particular location. The count sensor may supply the number of items to a database that stores the information on behalf of the count sensor. The sensor may be other types of sensors (e.g., distance sensors, temperature sensors, cameras, audio sensors, etc.) without departing from the invention.

In one or more embodiments of the invention, at least one of the local data sources (152A, 152N) is an Internet-of-things (IOT) device. For example, one of the data sources (152A) may be a camera operably connected to the Internet and that supplies data via an IOT standard to the local data manager (160). The data may be a video stream of a particular location. Image recognition may be utilized to extract relevant information from the video stream. The relevant information may be supplied to the local data manager (160) in isolation or in combination with the video stream itself.

In one or more embodiments of the invention, the local data manager (160) is a device (e.g., a computing device as shown in FIG. 4) that manages data obtained from the local data sources (152). The local data manager (160) may manage the data by storing the data in internal storage (e.g., persistent storage (166)) or external storage and/or providing the data to external entities (e.g., clients). The local data manager (160) includes a DCF configuration daemon (162), a data ingestion manager (164), and persistent storage (166). The local data manager may include additional, fewer, and/or different components without departing from the invention.

In one or more embodiments of the invention, the DCF configuration daemon (162) manages the configuration of components of the local data manger (160). Specifically, the DCF configuration daemon (162) configures the data ingestion manager (164) based on a DCF configuration file obtained from a data management system. The DCF configuration daemon (162) may configure the data ingestion manager (164) in accordance with the method of FIG. 2B. The DCF configuration daemon may configure the data ingestion manager (164), or other components of the local data manager (160), via other methods without departing from the invention.

In one or more embodiments of the invention, the DCF configuration daemon (162) is implemented as computing code stored on a persistent storage (e.g., 166) that when executed by a processor of the local data manager (160) performs the functionality of the DCF configuration daemon (162). The processor may be a hardware processor including circuitry such as, for example, a central processing unit or a microcontroller. The processor may be other types of hardware devices for processing digital information without departing from the invention.

In one or more embodiments of the invention, the data ingestion manager (164) manages how unprocessed data is obtained (also referred to as ingested) from the local data sources (152). The data ingestion manager (164) may process the unprocessed data to generate processed data store the processed data in accordance with a DCF pipeline. The DCF pipeline may be specified by a DCF configuration file used by the DCF configuration daemon to configure the data ingestion manager (164).

The persistent storage (166) may be configured to store data. The persistent storage (166) may be a physical storage. For example, the persistent storage (166) may include hard disk drives, solid state drives, and/or tape drives for storing data. The persistent storage (166) may include other types of non-transitory storage mediums without departing from the invention.

In one or more embodiments of the invention, the persistent storage (166) stores data obtained from the local data sources (152). The data stored in the persistent storage (166) may be provided to clients.

Figure 2A:
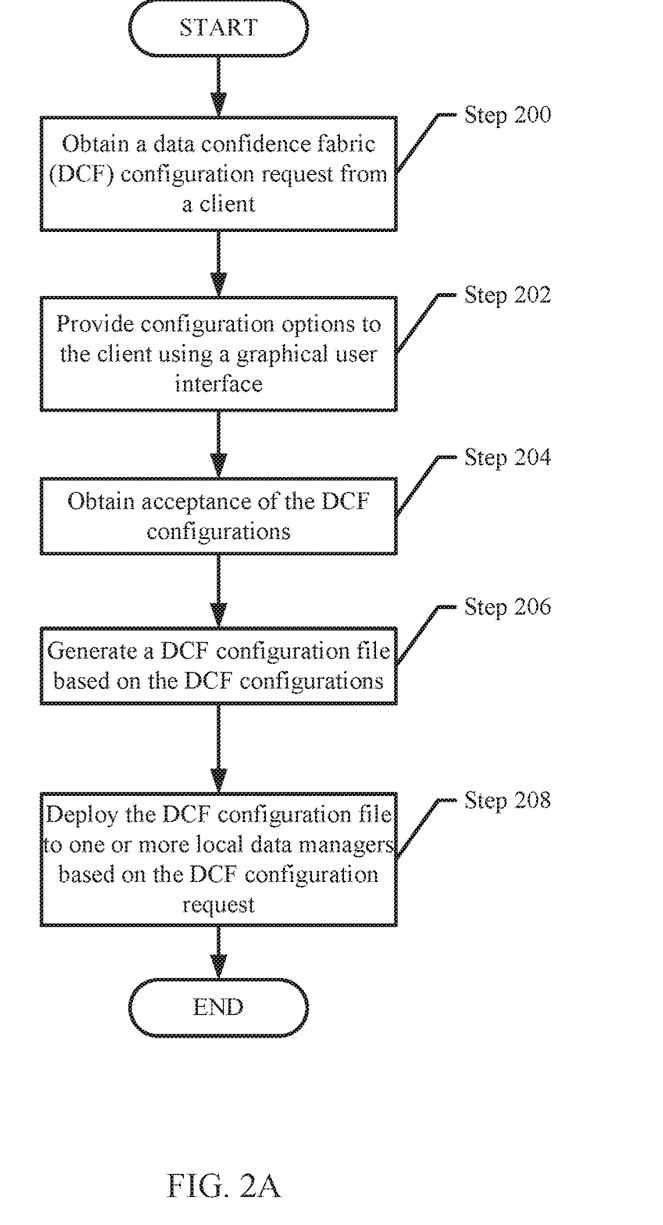
FIG. 2A shows a flowchart for managing a data confidence fabric configuration in accordance with one or more embodiments of the invention.
Figure 2B:
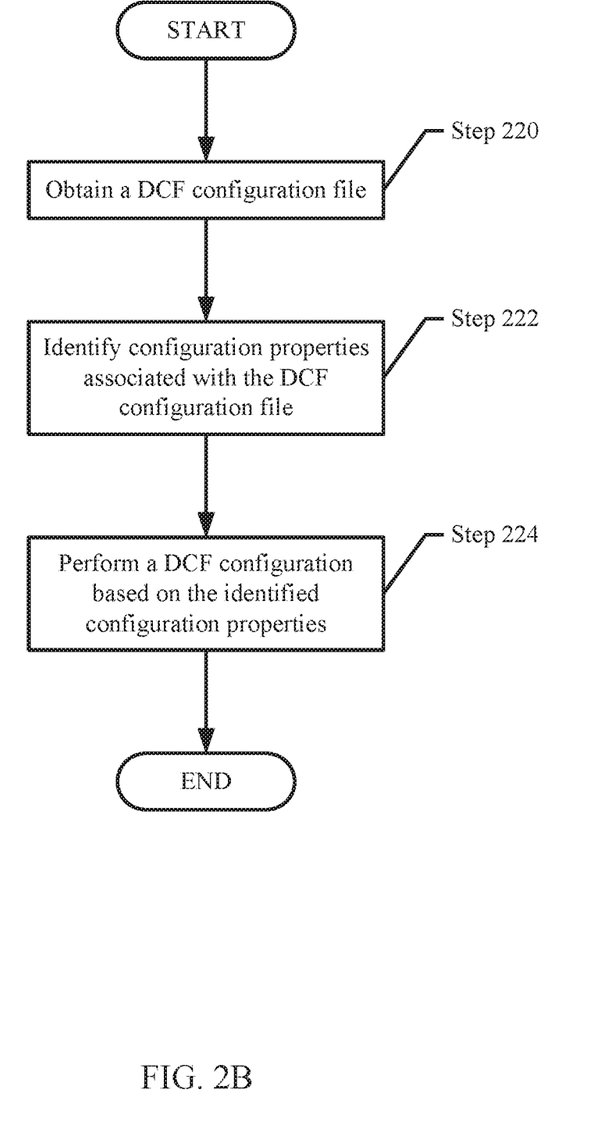
FIG. 2B shows a flowchart for configuring a local data manager in accordance with one or more embodiments of the invention.
Figure 2C:
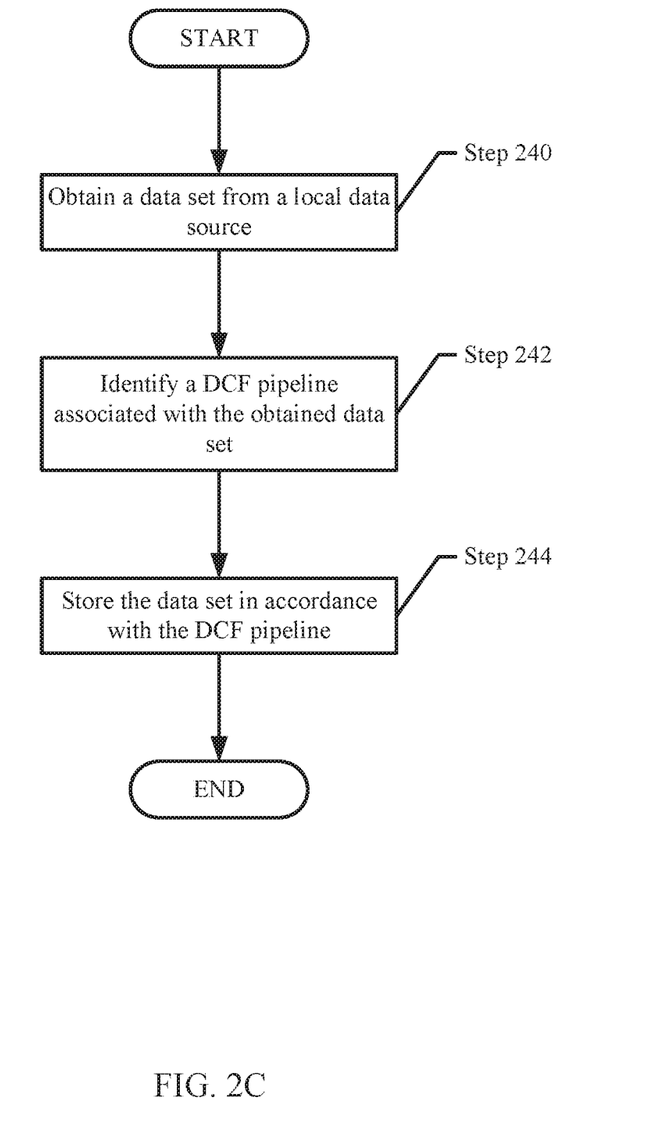
FIG. 2C shows a flowchart for performing data processing in accordance with one or more embodiments of the invention.

FIGS. 2A-2C show flowcharts in accordance with one or more embodiments of the invention. While the various steps in the flowcharts are presented and described sequentially, one of ordinary skill in the relevant art will appreciate that some or all of the steps may be executed in different orders, may be combined or omitted, and some or all steps may be executed in parallel. In one embodiment of the invention, the steps shown in FIGS. 2A-2C may be performed in parallel with any other steps shown in FIGS. 2A-2C without departing from the scope of the invention.

FIG. 2A shows a flowchart for managing data confidence fabric configuration in accordance with one or more embodiments of the invention. The method shown in FIG. 2A may be performed by, for example, a data management system (100, FIG. 1A). Other components of the system illustrated in FIG. 1A may perform the method of FIG. 2A without departing from the invention.

Turning to FIG. 2A, in step 200, a DCF configuration request is obtained. In one or more embodiments of the invention, the DCF configuration request is obtained by a DCF configurator of the data management system. The DCF configuration request may specify a request to configure one or more local data systems. In one or more embodiments of the invention, the DCF configuration request is obtained from a client. The DCF configuration request may specify the type of data to be processed (e.g., traffic data, temperature data, audio, etc.). Alternatively, the DCF configuration request may specify one or more local data systems.

In step 202, configuration options are provided to the client using a graphical user interface. In one or more embodiments of the invention, the DCF configuration options specify the options for configuring the local data systems. The options may be for augmenting the data, modifying the data, and/or storing the data. The DCF configuration options may be sent by the DCF configurator.

In one or more embodiments of the invention, the client makes a selection of the options using the GUI. The selection of the options may include all or a portion of the options provided by the data management system. The options may be displayed using categories based on the types of options for configuration. For example, a first category may be "Device Data" that displays options for configuring the type of data to be processed during data ingestion. A second category may be, for example, "Provenance Data" that displays options for configuring the generation of metadata associated with ingested data. A third category may be, for example, "Identity" that displays options for configuring the identification information of the obtained data. Additional categories may be displayed for additional options without departing from the invention.

In one embodiment of the invention, the GUI is provided to the client in response to the DCF configuration. In other words, the GUI is sent to the client to be used when selecting from the configuration options.

In one embodiment of the invention, access to the GUI is provided to the client. For example, a link (e.g., a hyperlink) to the GUI is sent to the client, and the GUI may be accessed by the client from the data management system.

Alternatively, the configuration options may be provided to the client using a non-graphical user interface such as, for example, a command line interface (CLI) or a hypertext transfer protocol (HTTP) interface. The client may communicate the selection using the corresponding non-graphical user interface.

In step 204, acceptance of the DCF configurations is obtained. In one or more embodiments of the invention, the acceptance includes the selection of the configuration options.

In step 206, a DCF configuration file is generated based on the DCF configurations. In one or more embodiments of the invention, the DCF configuration file is generated by obtaining a data structure that specifies the selection of options in a format that is readable by a DCF configuration daemon. The DCF configuration file may specify a DCF pipeline that specifies a process for modifying, augmenting, and/or storing data based on the selection of configuration options. The DCF configuration file may be generated by the DCF configurator.

In step 208, the DCF configuration file is deployed to one or more local data managers based on the DCF configuration request. In one or more embodiments of the invention, the DCF configuration file is deployed using a push deployment mechanism that includes sending the configuration file as a virtual container to one or more local data managers. The local data managers may be specified in the DCF configuration file. Alternatively, the DCF configuration file may specify a type of data, and the DCF configurator may identify one or more local data managers that obtain the type of data. The DCF configuration file may then be sent to the identified local data managers.

In one or more embodiments of the invention, the DCF configuration file is deployed using a decentralized deployment mechanism. The decentralized deployment mechanism may include generating a configuration file identifier associated with the DCF configuration file and providing the configuration file identifier, along with a minimum set of information that may be used by the local data managers to determine whether (or not) to request the DCF, to all (or a portion) of the local data management systems. Each local data manager may determine whether to obtain the DCF configuration file from the data management system in response to receiving the configuration file identifier (and the aforementioned accompanying information). If a local data manager determines that if should obtain the DCF, the local data may send a request that specifies the confirmation file identifier to the data management system. The data management system subsequently sends the DCF configuration file to the local data manager.

FIG. 2B shows a flowchart for configuring a local data manager in accordance with one or more embodiments of the invention. The method shown in FIG. 2B may be performed by, for example, a local data manager (160, FIG. 1C). Other components of the system illustrated in FIG. 1A or FIG. 1C may perform the method of FIG. 2B without departing from the invention.

In step 220, a DCF configuration file is obtained. In one or more embodiments of the invention, the DCF configuration file is obtained based on the deployment mechanism of the data management system (as described above).

In step 222, configuration properties associated with the DCF configuration file are identified. The configuration properties may be identified using a DCF configuration daemon of the local data manager. In one or more embodiments of the invention, the configuration properties include each configuration options specified in the DCF configuration file. The DCF configuration daemon may analyze the DCF configuration file and identify each configuration property.

In one or more embodiments of the invention, each configuration property specifies a configuration for augmenting, modifying, and/or storing data obtained from one or more local data sources. The configuration property may specify the local data source and/or the type of data for which the local data manager is to process the data.

In step 224, a DCF configuration is performed based on the identified configuration properties. In one or more embodiments of the invention, the configuration is performed by selecting an identified configuration property and configuring a data ingestion manager to perform a process in accordance with the configuration property. For example, a configuration property may specify a digital signature to be generated for incoming traffic data. The DCF configuration daemon may configure the data ingestion manager to determine whether incoming data is traffic data and, if the incoming data is traffic data, to generate a signature of the incoming data. The process may be repeated for all identified configuration properties.

In one or more embodiments of the invention, the configuration is performed by generating a DCF pipeline based on the configuration properties. The DCF pipeline may be a process for processing incoming data in accordance with the configuration properties. The DCF pipeline may be associated with a type of data and/or a local data source. The DCF configuration daemon may subsequently configure the data ingestion manager to perform the DCF pipeline for associated data sets and/or associated local data sources.

In one embodiment of the invention, the local data manager may implement different DCF pipelines for different local data sources and/or the sample DCF pipeline for different local data sources.

FIG. 2C shows a flowchart for performing data processing in accordance with one or more embodiments of the invention. The method shown in FIG. 2C may be performed by, for example, a local data manager (160, FIG. 1C). Other components of the system illustrated in FIG. 1A or FIG. 1C may perform the method of FIG. 2C without departing from the invention.

In step 240, a data set (or data) is obtained from a local data source. The data set may be obtained by a data ingestion manager of the local data manager.

In step 242, a DCF pipeline is identified associated with the obtained data set. In one or more embodiments of the invention, the data ingestion manager may identify a type of data of the data set, the source of the data set (e.g., the local data source), and/or any other characteristics of the data set, and, using the aforementioned characteristics, identify a DCF pipeline that is associated with the data set. For example, if the obtained data set is an audio recording, the data ingestion manager may identify a DCF pipeline associated with audio data. In another example, the data set may be for a specific local data source (e.g., data obtained from a specific IoT device). In this scenario, the DCF pipeline for the specific IoT device is selected. In one embodiment of the if there are multiple matching DCF pipelines for the data set, then (i) the most specific DCF pipeline is selected (i.e., the DCF pipeline that matches the greatest number of data set characteristics); (ii) the data is processed using all matching DCF pipelines, or (iii) local data manager may directly or indirectly request feedback from a client or the data management system to determine which DCF pipeline to use to process the data set.

In step 244, the data set is stored in accordance with the DCF pipeline(s). In one or more embodiments of the invention, the DCF pipeline performs the DCF pipeline to store the obtained data set. The data ingestion manager may perform the process of the DCF pipeline in the specified order. In one or more embodiments of the invention, the process includes augmenting the data, modifying the data, and/or storing the data. The data ingestion manager may augment the data, modify the data, and/or store the data in accordance with the DCF pipeline.

EXAMPLE

Figure 3A:
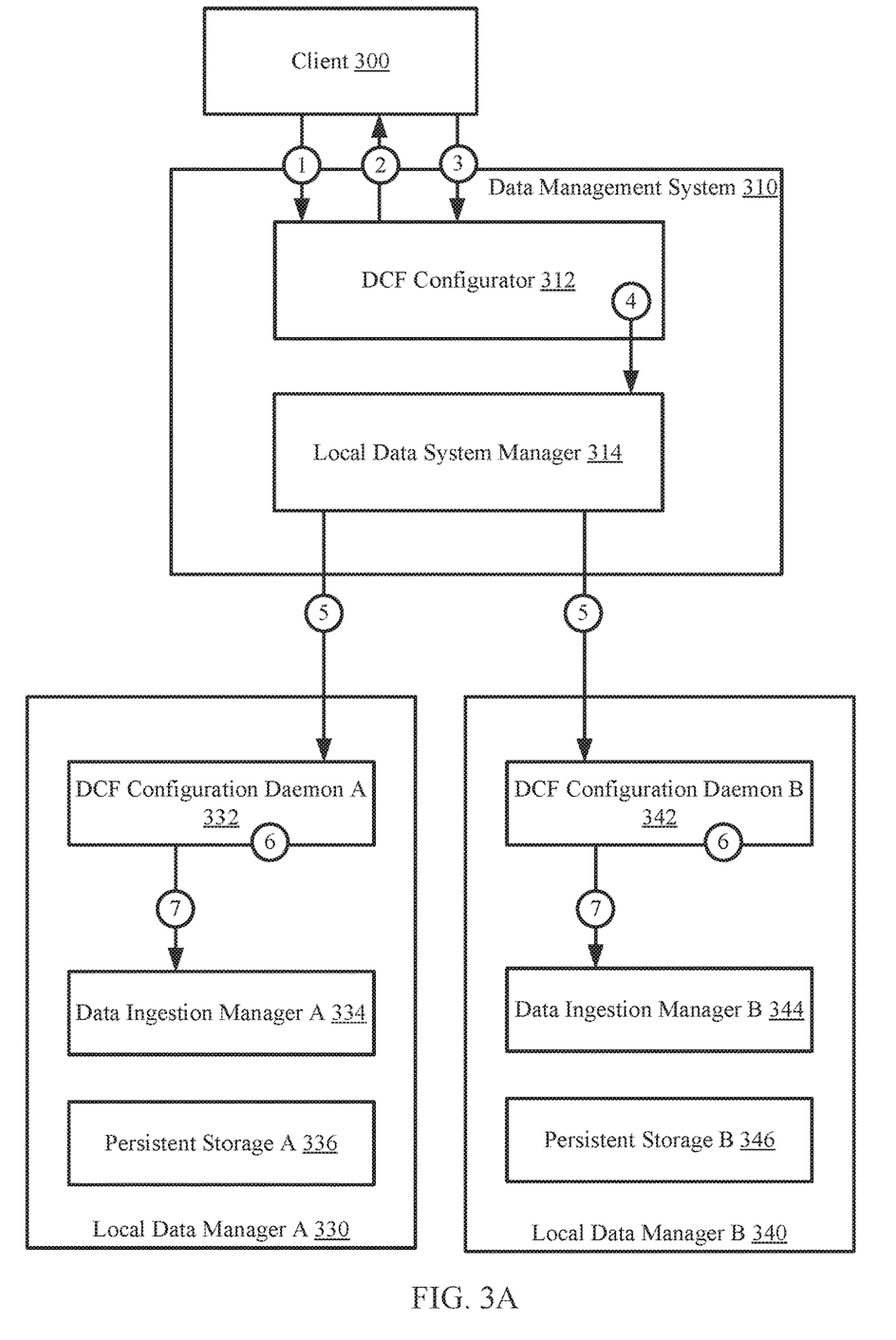
FIGS. 3A-3B show an example in accordance with one or more embodiments of the invention.
Figure 3B:
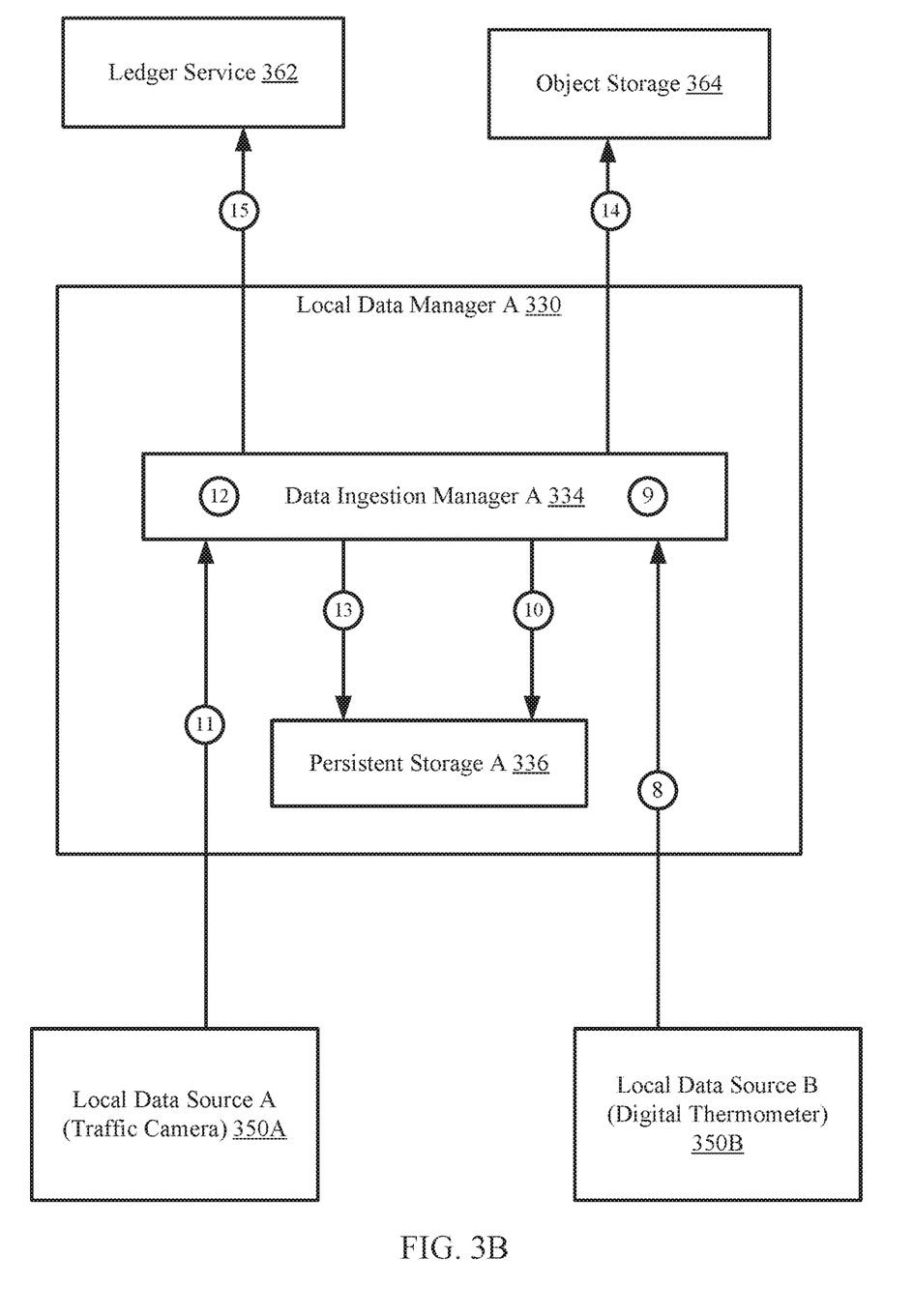

The following section describes an example. The example, illustrated in FIGS. 3A-3B, is not intended to limit the invention. Turning to the example, consider a scenario in which a client would like to configure a data confidence fabric (DCF) to store data reliably. The data may be data streamed to a local data manager by a traffic camera.

FIG. 3A shows an example system in accordance with one or more embodiments of the invention. The system includes a client (300) communicating with a data management system (310). The client sends a request to the data management system (310) to configure local data managers A and B (330, 340) that obtain the data [1]. The data management system (310) uses a DCF configurator (312) to provide configuration options to the client (300) [2]. The configuration options specify options for augmenting, modifying, and/or storing data obtained by the local data managers (330, 340). The client (300) uses a graphical user interface (GUI)

to make the selections of the options. The client (300) makes a selection of options that include the following options: (i) an option to generate a digital signature of all traffic data obtained by the local data managers (330, 340), (ii) an option to generate identification information that specifies an owner of the traffic data, (iii) an option to store the traffic data in an object storage, and (iv) an option to store the traffic data and identification information in a ledger service. The client (300) provides the selection to the DCF configurator (312) [3].

The DCF configurator (312) uses the selection of options to generate a DCF configuration file [4]. The DCF configuration file specifies a DCF pipeline that is to be performed by specified local data managers (330, 340). The DCF pipeline specifies the following process: (i) generate a digital signature of the traffic data, (ii) obtain identification information of the obtained data, (iii) store the traffic data in an object storage, and (iv) store the identification information and the obtained traffic data in persistent storage of the local data manager and in a ledger service.

After the DCF configuration file is generated, a local data system manager (314) of the data management system (310) deploys the DCF configuration file to the specified local data managers (330, 340) [5]. Specifically, the local data system manager (314) uses a deployment mechanism that includes sending the DCF configuration file to the specified local data managers (330, 340).

A DCF configuration daemon (332, 342) of each local data manager (330, 340) obtains the DCF configuration file and identifies the DCF properties [6]. Specifically, the DCF configuration daemon (332, 342) identifies the DCF pipeline to be performed by the data ingestion managers (334, 344). The DCF configuration daemon (332, 342) each configures the corresponding data ingestion manager (334, 344) to perform the DCF pipeline for any ingested traffic data [7].

FIG. 3B shows a diagram of the system at a later point in time. The system shows local data manager A (330) obtaining a first data set from local data source B (350B) [8]. The data set is temperature readings. The data ingest manager (334) obtains the data and processes the data in accordance with a DCF pipeline associated with temperature readings (which in this example was configured prior to the configuration of the DCF pipeline associated with traffic data) [9]. Specifically, in this example and in accordance with the DCF pipeline associated with temperature readings), the data ingest manager (334) generates metadata associated with the temperature readings and embeds the metadata in the data set to obtain processed data. The processed data is stored in persistent storage (336) of the local data manager (330) [10].

At a later point in time, a second data set is obtained from local data source A (350A) [11]. The second data set is traffic data. The data ingestion manager (334) obtains the second data set and processes it in accordance with a DCF pipeline associated with traffic data. The data ingestion manager (334) identifies the DCF pipeline obtained in FIG. 3A as the DCF pipeline to perform on the traffic data.

The data ingestion manager (334) performs the process specified by the DCF pipeline. Specifically, the data ingestion manager (334) generates a digital signature on the traffic data and generates identification information that specifies the owner of the traffic data [12]. The digital signature and the identification information are embedded in the traffic data to obtain processed traffic data. The processed traffic data is stored in persistent storage (336) [13]. Further, the processed traffic is stored in an object entry of an object storage (364) [14]. The processed traffic data (or a hash of the traffic data), along with the identification information, is then stored in a ledger service (362) [15].

END OF EXAMPLE

As discussed above, embodiments of the invention may be implemented using computing devices. FIG. 4 shows a diagram of a computing device in accordance with one or more embodiments of the invention. The computing device (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), input devices (410), output devices (408), and numerous other elements (not shown) and functionalities. Each of these components is described below.

In one embodiment of the invention, the computer processor(s) (402) may be an integrated circuit for processing instructions. For example, the computer processor(s) may be one or more cores or micro-cores of a processor. The computing device (400) may also include one or more input devices (410), such as a touchscreen, keyboard, mouse, microphone, touchpad, electronic pen, or any other type of input device. Further, the communication interface (412) may include an integrated circuit for connecting the computing device (400) to a network (not shown) (e.g., a local area network (LAN), a wide area network (WAN) such as the Internet, mobile network, or any other type of network) and/or to another device, such as another computing device.

In one embodiment of the invention, the computing device (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

One or more embodiments of the invention may improve the operation of one or more computing devices. More specifically, embodiments of the invention improve the reliability of providing data to a client from, e.g., IoT by managing a data confidence fabric between the client and the internet of things devices. The data confidence fabric is managed by configuring devices that obtain the data to perform specified processes, at the time of ingest, to the data that increase the reliability in using the data. The processed may increase the reliability of the data by augmenting the data to include additional information that may further specify where the data comes from and/or how the data was obtained. In this manner, the client may rely on the additional information to determine a confidence in using the data for application purposes.

Further, embodiments of the invention allow options for modifying the obtained data such that security measures are implemented on the obtained data, further increasing the reliability of the data. In this manner, the client may rely on the modifications to determine that the data has not been undesirably tampered with (or otherwise modified), thus further increasing the reliability of the data.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A method for managing data, the method comprising:
   obtaining, by a data management system, a data confidence fabric (DCF) configuration request from a client; and
   in response to the DCF configuration request:
      providing a plurality of DCF configuration options to the client;
      obtaining acceptance of a portion of the plurality of DCF configuration options;
      generating a DCF configuration file based on the portion of the plurality of DCF configuration options, wherein the configuration file specifies a DCF pipeline; and
      deploying the DCF configuration file to a local data manager.

2. The method of claim 1, further comprising:
   obtaining, by the local data manager, a data set;
   identifying the DCF pipeline; and
   storing the data set based on the DCF pipeline.

3. The method of claim 1, wherein deploying the DCF configuration file to a local data manager comprises:
   sending the configuration file to a DCF configuration daemon of the local data manager; and
   prompting the DCF configuration daemon to configure a data ingestion manager of the local data manager to perform the DCF pipeline.

4. The method of claim 1, wherein the DCF pipeline specifies at least one of: a process for augmenting data, a process for modifying data, and a process for storing data.

5. The method of claim 4, wherein the process for augmenting data comprises at least one of: generating metadata associated with the data and generating a digital signature associated with the data.

6. The method of claim 4, wherein the process for modifying data comprises at least one of: encrypting the data and compressing the data.

7. The method of claim 4, wherein the process for storing the data comprises at least one of: storing a copy of the data in a ledger service, storing a copy of metadata associated with the data in an object storage, or generating a ledger entry associated with the data.

8. A non-transitory computer readable medium comprising computer readable program code, which when executed by a computer processor enables the computer processor to perform a method, the method comprising:
   obtaining, by a data management system, a data confidence fabric (DCF) configuration request from a client; and
   in response to the DCF configuration request:
      providing a plurality of DCF configuration options to the client;
      obtaining acceptance of a portion of the plurality of DCF configuration options;
      generating a DCF configuration file based on the portion of the plurality of DCF configuration options, wherein the configuration file specifies a DCF pipeline; and
      deploying the DCF configuration file to a local data manager.

9. The non-transitory computer readable medium of claim 8, the method further comprising:
   obtaining, by the local data manager, a data set;
   identifying the DCF pipeline; and
   storing the data set based on the DCF pipeline.

10. The non-transitory computer readable medium of claim 8, wherein deploying the DCF configuration file to a local data manager comprises:
    sending the configuration file to a DCF configuration daemon of the local data manager; and
    prompting the DCF configuration daemon to configure a data ingestion manager of the local data manager to perform the DCF pipeline.

11. The non-transitory computer readable medium of claim 8 wherein the DCF pipeline specifies at least one of: a process for augmenting data, a process for modifying data, and a process for storing data.

12. The non-transitory computer readable medium of claim 11, wherein the process for augmenting data comprises at least one of: generating metadata associated with the data and generating a digital signature associated with the data.

13. The non-transitory computer readable medium of claim 11, wherein the process for modifying data comprises at least one of: encrypting the data and compressing the data.

14. The non-transitory computer readable medium of claim 11, wherein the process for storing the data comprises at least one of: storing a copy of the data in a ledger service, storing a copy of metadata associated with the data in an object storage, or generating a ledger entry associated with the data.

15. A system, comprising:
    a processor;
    memory comprising instructions, which when executed by the processor, perform a method, the method comprising:
       obtaining, by a data management system, a data confidence fabric (DCF) configuration request from a client; and
       in response to the DCF configuration request:
          providing a plurality of DCF configuration options to the client;
          obtaining acceptance of a portion of the plurality of DCF configuration options;
          generating a DCF configuration file based on the portion of the plurality of DCF configuration options, wherein the configuration file specifies a DCF pipeline, and wherein the DCF pipeline specifies at least one of: a process for augmenting data, a process for modifying data, and a process for storing data; and
          deploying the DCF configuration file to a local data manager.

16. The system of claim 15, the method further comprising:
    obtaining, by the local data manager, a data set;
    identifying the DCF pipeline; and
    storing the data set based on the DCF pipeline.

17. The system of claim 15, wherein deploying the DCF configuration file to a local data manager comprises:
sending the configuration file to a DCF configuration daemon of the local data manager; and
prompting the DCF configuration daemon to configure a data ingestion manager of the local data manager to perform the DCF pipeline.

18. The system of claim 15, wherein the process for augmenting data comprises at least one of: generating metadata associated with the data and generating a digital signature associated with the data.

19. The system of claim 15, wherein the process for modifying data comprises at least one of: encrypting the data and compressing the data.

20. The system of claim 15, wherein the process for storing the data comprises at least one of: storing a copy of the data in a ledger service, storing a copy of metadata associated with the data in an object storage, or generating a ledger entry associated with the data.

* * * * *